US012403572B2

(12) United States Patent
Schmider et al.

(10) Patent No.: US 12,403,572 B2
(45) Date of Patent: Sep. 2, 2025

(54) OIL FILTER REMOVAL TOOL

(71) Applicant: CANADIAN TIRE CORPORATION, LIMITED, Toronto (CA)

(72) Inventors: John Paul Schmider, Toronto (CA); Edmond Mok, Toronto (CA); Aras Puodzinuas, Toronto (CA); Abdul Haleem Ahamed Koya, Toronto (CA); Patrick Tallon, Toronto (CA); David Green, Toronto (CA)

(73) Assignee: CANADIAN TIRE CORPORATION, LIMITED, Toronto (CA)

( * ) Notice: Subject to any disclaimer, the term of this patent is extended or adjusted under 35 U.S.C. 154(b) by 315 days.

(21) Appl. No.: 17/891,305

(22) Filed: Aug. 19, 2022

(65) Prior Publication Data

US 2023/0347485 A1 Nov. 2, 2023

(30) Foreign Application Priority Data

Apr. 29, 2022 (CA) ................................ CA 3157044

(51) Int. Cl.
*B25B 27/00* (2006.01)

(52) U.S. Cl.
CPC ................................ *B25B 27/0042* (2013.01)

(58) Field of Classification Search
CPC ............................ B25B 7/123; B25B 27/0042
USPC ........................................ 81/342, 423, 424.5
See application file for complete search history.

(56) References Cited

U.S. PATENT DOCUMENTS

| | | | | | |
|---|---|---|---|---|---|
| 116,077 | A * | 6/1871 | Morrison | A47J 45/10 | 81/347 |
| 1,445,908 | A * | 2/1923 | Perkins | A47J 45/10 | 81/421 |
| D140,065 | S * | 1/1945 | Wright | D8/58 | |
| 2,779,224 | A * | 1/1957 | Coggburn | B25F 1/00 | 81/424 |
| 3,383,963 | A * | 5/1968 | Vondrachek | B25B 7/04 | 81/177.85 |
| 4,651,598 | A * | 3/1987 | Warheit | B25B 7/12 | 81/394 |
| 5,865,072 | A * | 2/1999 | Jerdee | B25B 7/02 | 81/9.3 |
| D492,555 | S * | 7/2004 | Tatom | D8/21 | |
| 8,328,170 | B2 * | 12/2012 | Wasinger | B25B 7/123 | 269/216 |

(Continued)

*Primary Examiner* — Hadi Shakeri
(74) *Attorney, Agent, or Firm* — Whiteford, Taylor & Preston, LLP; Gregory M. Stone

(57) ABSTRACT

Oil filters used in automotive vehicles come in different sizes and may be located at varying positions on the engine which differ in terms of ease of access. Due to such variability, multiple specialized tools have typically been required to remove installed oil filters from automotive engines, including various sized pliers, straps, bands and the like, the selection of the tool depending on the location and size of the oil filter, and the angle of approach required. An oil filter removal tool is now provided which has at least two sets of opposing gripping regions, the two sets being in perpendicular orientation relative to each other. Advantageously, the oil filter removal tool may be used to approach and grasp the oil filter from an axial or radial direction, and may be used with different sizes of oil filters.

9 Claims, 27 Drawing Sheets

(56) References Cited

U.S. PATENT DOCUMENTS

| | | | | |
|---|---|---|---|---|
| D704,014 | S * | 5/2014 | Hernandez, Jr. | D8/22 |
| 2008/0276767 | A1 * | 11/2008 | Huang | B25B 13/00<br>81/319 |

* cited by examiner

OIL FILTER REMOVAL TOOL

CROSS-REFERENCE TO RELATED APPLICATIONS

This application claims priority to Canadian Patent Application No. 3157044 titled "Oil Filter Removal Tool," filed by the inventors herein on Apr. 29, 2022, the specification of which is incorporated herein by reference in its entirety.

FIELD OF THE INVENTION

The present invention relates to oil filter removal tools for use with automotive vehicles.

BACKGROUND

Vehicles require clean motor oil to lubricate an internal combustion engine and to keep it operating smoothly. To do so, the motor oil is used in conjunction with an oil filter in vehicles to filter debris and contaminants such as carbon dust from the engine oil as it circulates, thus reducing the accumulation of particles that can lead to engine wear. The outside of the oil filter is commonly constructed as a cylindrical metal container. The internal filter itself is generally made of synthetic fiber.

To maintain engine performance, oil and oil filters require regular replacement. Oil filters are usually located at the base of the vehicle's engine, near the bottom, or in other positions on the engine that can facilitate draining of spent oil following removal of the oil filter.

Oil filters generally include a rubber seal and threading on one end to allow for a sealed connection to the engine. While new oil filters may be installed by hand, when it is time for their removal, a wrench or other similar tool is needed. Oil filters that have been installed and used over several months become soiled, and the rubber seal interfacing with the engine becomes tacky and tends to stick. Therefore, mechanical assistance using a tool such as a wrench is needed in order to rotate the oil filter so that it may be removed.

Oil filters come in a range of diameters. They may also be installed in a variety of locations on the engine with varying accessibility, which necessitates different angles or planes of approach to grasp and turn the oil filter. Existing oil filter removal tools such as pliers, bands, chain wrenches, and strap wrenches may be employed to remove the oil filter. However, a downside of existing tools has been that in many cases, tools are only well adapted to fit a narrow range of oil filter sizes, and most existing tools are not sufficiently versatile to access the oil filter from a number of angles or in tight spaces. As well, using an oil filter removal tool that is not sized to grip a particular size of oil filter can be ineffective as it can be difficult to grip the filter properly. Tools of the prior art, particularly if ill-fitting in relation to the oil filter at hand, may also be less able to securely grip an oil filter having a surface that is soiled or greasy.

As a result, in typical practice, in order to be able to change the oil filters on a number of models and makes of vehicles, such as in an automotive maintenance facility, it has been necessary to maintain a collection of various sized tools of different configurations and grasping capacities so that the appropriate tool may be chosen for accessing and securely gripping the oil filter, depending on its diameter, orientation, and placement on the engine. This results in inconvenience, extra expense, and issues in space-restricted settings.

Given the above, a need exists in the prior art for an improved oil filter removal tool that addresses one or more of these or other issues.

SUMMARY OF THE INVENTION

It is an object of the disclosure to provide an improved oil filter removal tool that may be used with a larger variety of sizes of oil filters, and which may access and securely grasp the oil filter from a number of approaches and angles.

According to an aspect of the present disclosure, an oil filter removal tool is provided for removing previously installed oil filters from engines. In a preferred embodiment, the oil filter removal tool has a handle region for gripping having a first arm and a second arm. Each of the first arm and the second arm has a handle end opposing a connecting neck region. A jaw region extends from each connecting neck region to form a mouth for removably receiving the oil filter.

The jaw region may have a mouth end for grasping and a base end for connecting the mouth to the connecting neck region. It may further have terminal clamping elements extending orthogonally from each mouth end to provide a profile reminiscent of the head of a hammerhead shark, which will be referred to as a "hammerhead profile". At least one of the handle end of the first arm and the handle end of the second arm may be inwardly moveable relative to the other of the handle end of the first arm and the handle end of the second arm to urge a corresponding inward movement of at least one of the connecting neck regions of the first arm and the second arm, such that the mouth decreases in size relative to the inward movement.

An embodiment of the mouth ends of the jaw as described herein may have at least two distinct sets of opposing gripping surfaces configured to contact and grip oil filters in a variety of sizes, orientations, and positions within the engine. Said two distinct sets of gripping surfaces may respectively extend along the inside edges of the jaw, and along the inwardly facing edges of the terminal clamping elements, and may be perpendicularly oriented relative to each other.

Advantageously, as will be shown herein, having two sets of perpendicularly oriented gripping surfaces incorporated into the jaw of the oil filter removal tool, with some embodiments having serrated gripping surfaces, greatly increases the range of sizes of oil filters with which the tool may be used, as well as increasing the angles from which the installed oil filter may be contacted and securely gripped. The oil filter removal tool may be characterized as a "universal" oil filter removal tool in that one tool of the invention may replace a multitude of types and sizes of oil filter wrenches that were previously required in order to change oil filters having different sizes, or installed in different areas of the engine leading to variability in accessibility.

As mentioned above, the gripping surfaces along the edges of the jaw and terminal clamping elements may be serrated in order to provide a secure grip of the oil filter no matter what angle it is approached from. The serrations also effectively increase the range of sizes of oil filter the tool may be used with. When used for grasping an oil filter for removal, the serrations may lightly dent the surface of the oil filter, increasing the security of the grip, even if the oil filter is not a size that closely fits the curvature of either of the gripping surfaces.

What is therefore provided is a universal oil filter removal tool or wrench which is versatile and replaces many oil filter removal tools of the prior art, which were specific to certain sizes of oil filter or configured to only be able to access the oil filter from certain angles and approaches. Such a universal oil filter removal tool allows the user to remove oil filters of various sizes and from a greater variety of engine locations that cause varying accessibility of the oil filters, all with a single tool.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

These and other features will become more apparent from the following description in which reference is made to the appended drawings wherein.

DETAILED DESCRIPTION OF THE PREFERRED EMBODIMENTS

Figure 1:
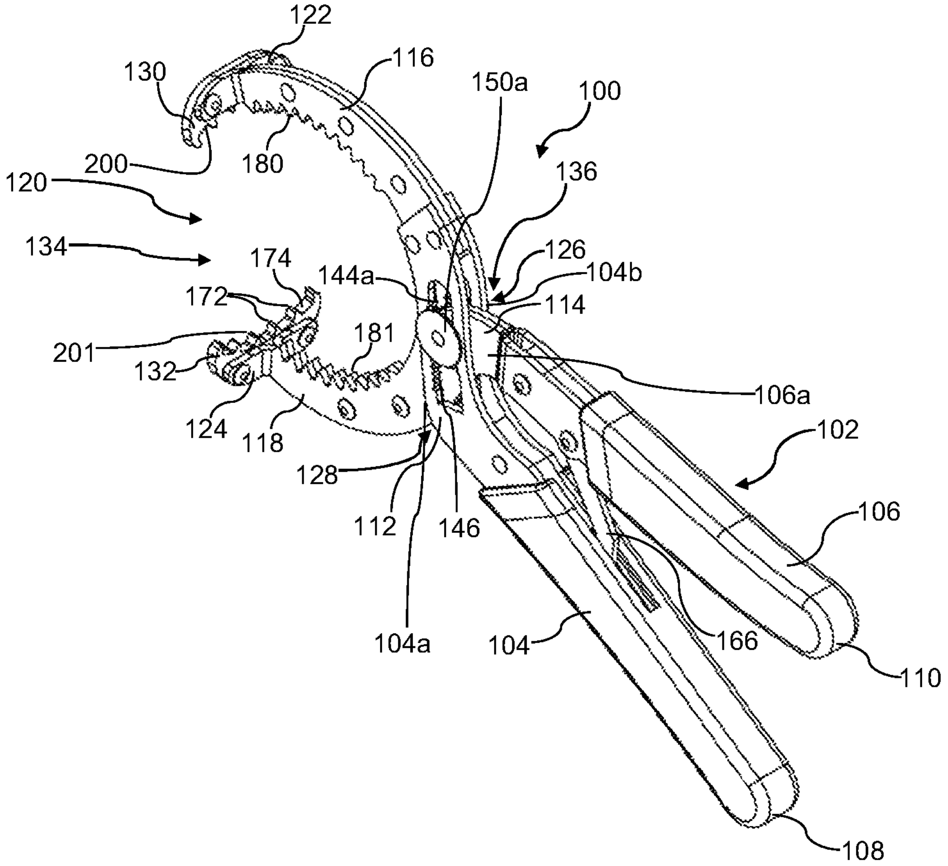
FIG. 1 shows a perspective view of an illustrative oil filter removal tool having an adjustable pivoting mechanism according to an aspect of the present disclosure.

The following detailed description is provided to gain a comprehensive understanding of the methods, apparatuses and/or systems described herein. Various changes, modifications, and equivalents of the systems, apparatuses and/or methods described herein will suggest themselves to those of ordinary skill in the art.

Reference is made to the figures throughout, in which illustrative oil filter removal tools are indicated generally as 100. Also provided for ease of reference at the end of this description is a parts list. While several embodiments of the invention are described below, like reference numerals generally designate like features.

Figure 2:
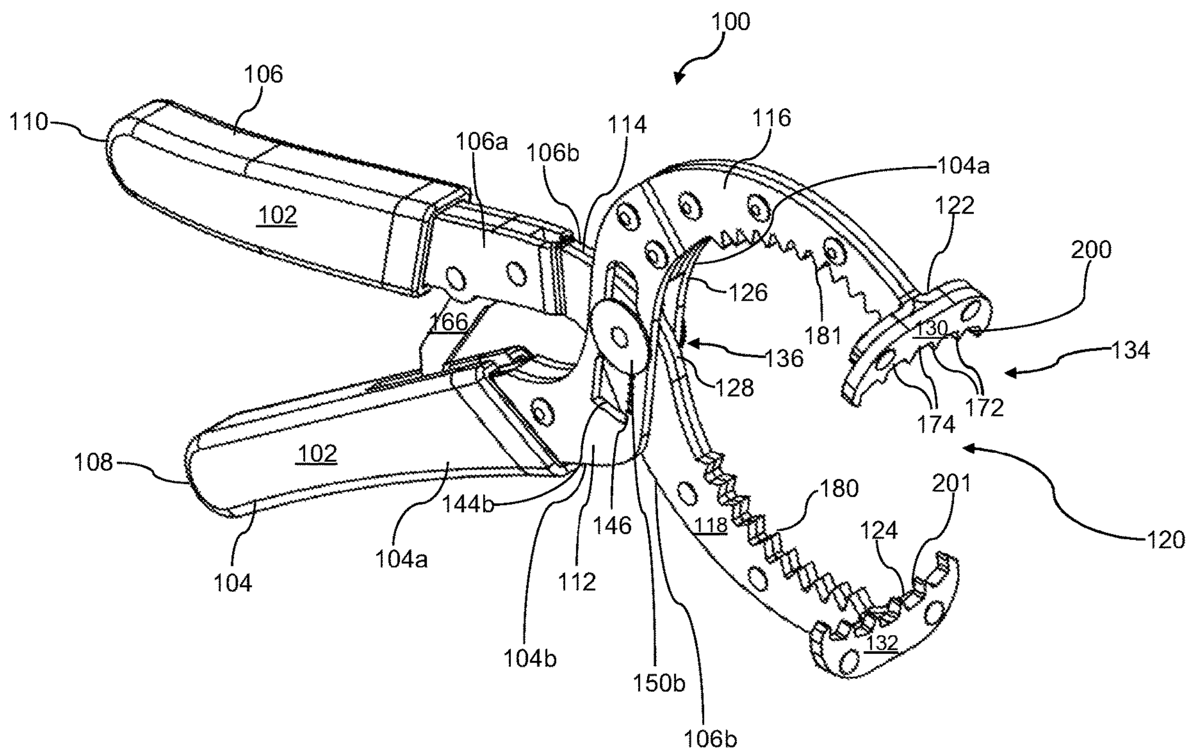
FIG. 2 shows an alternative perspective view of the oil filter removal tool of FIG. 1.

In one aspect of the present disclosure, as shown in FIGS. 1 and 2, an oil filter removal tool 100 is provided for removing the oil filter 10 which has previously been installed on a vehicle's engine. The oil filter removal tool 100 comprises a handle region 102 for gripping having a first arm 104 and a second arm 106. Each of the first arm 104 and the second arm 106 has a respective handle end 108 and 110, opposing a connecting neck region, respectively 112 and 114. A jaw region 116, 118 extends from each connecting neck region 112, 114 to form a mouth 120 for removably receiving a cap 10.

Each jaw region 116, 118 has a jaw end 122, 124 for grasping, and jaw base ends 126, 128 for connecting to the neck regions 112, 114. Terminal clamping elements 130, 132 extend orthogonally from each jaw end 122, 124, and are shaped in a manner to each have a hammerhead profile, as visible in front view in FIG. 7.

Figure 3:
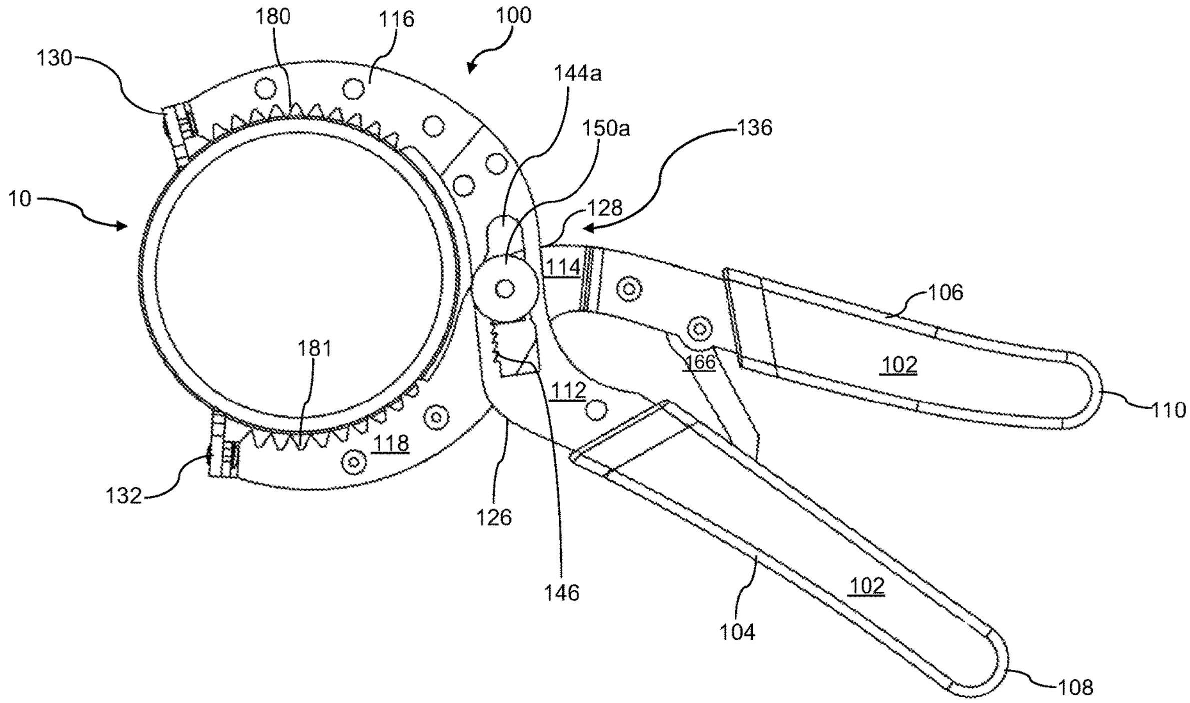
FIG. 3 shows a side elevation view of the oil filter removal tool of FIG. 1 in use with a radial approach relative to the oil filter.
Figure 4:
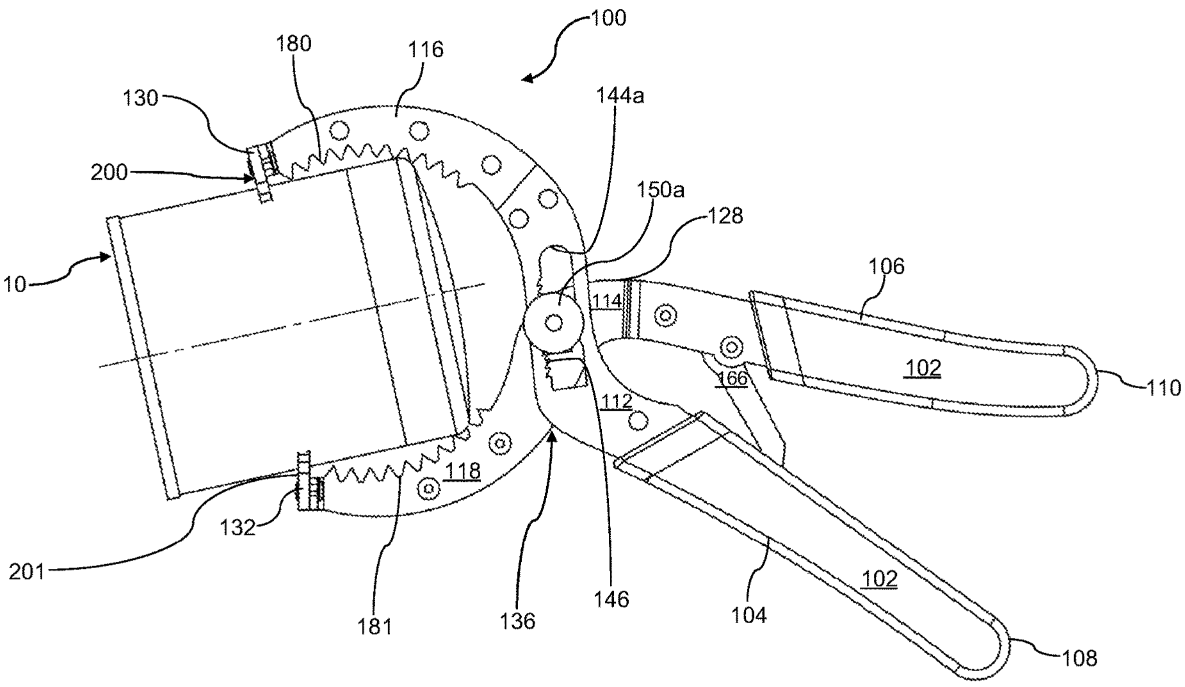
FIG. 4 shows a side elevation view of the oil filter removal tool of FIG. 1 in use with a axial approach relative to the oil filter.

FIGS. 3 and 4 show the oil filter removal tool 100 being used to grip oil filters 10. In FIG. 3, the first and second jaw regions 116 and 118 are gripping an oil filter 10 which has been approached radially, i.e. with a perpendicular approach relative to the longitudinal axis of oil filter 10. The first and second jaw regions 116 and 118 are configured with respective first and second gripping surfaces 180 and 181. As evident, first and second gripping surfaces 180 and 181 are curved to fit the profile of oil filter 10 to provide for a secure connection thereto. In the radial approach, the mouth 120 encases the body of the oil filter 10 from a radial plane without obstructing or otherwise receiving the face of the oil filter 10. The tool 100 can then be rotated around the radial plane to loosen oil filter 10.

In FIG. 4, it can be seen that oil filter 10 has been approached axially, from its top end, i.e. in a direction parallel to its longitudinal axis, with terminal clamping elements 130 and 132 being used to grip oil filter 10. Terminal clamping element 130 also features third gripping surface 200 along an inner edge, and terminal clamping element 132 similarly features fourth gripping surface 201 along an inner edge. Third and fourth gripping surfaces 200 and 201 are best seen in front view provided in FIG. 7. As also shown therein, third and fourth gripping surfaces 200 and 201 are curved to fit the profile of oil filter 10 and can in this manner provide for a secure connection thereto even when oil filter 10 is grasped axially. In the axial approach, the mouth 120 encases the body of the oil filter 10 from an axial plane by receiving the face of the oil filter 10 as shown in FIG. 4. Accordingly, given their hammerhead profile, the terminal clamping elements 130, 132 grasp the cylindrical body radially. The oil filter removal tool 100 can then be rotated on the axial plane to loosen the oil filter.

In the embodiments shown, first and second gripping surfaces 180 and 181 are directly opposite each other, and oriented perpendicularly to third and fourth gripping surfaces 200 and 201, which are similarly directly opposite each other. Such a configuration and arrangement of gripping surfaces greatly increases the versatility of oil filter removal tool 100. It may be used with a variety of size ranges for an oil filter 10, and may be used to approach oil filter 10 from different angles depending on the orientation of oil filter 10 and any space restrictions caused by its location when installed on an engine.

The jaw regions 116, 118 form a mouth 120 that increases and decreases in size in response to the movement of the first arm 104 and second arm 106. The handle end 108, 110 of the first and second arm 104, 106 are inwardly moveable to urge a corresponding inward movement of the respective jaw ends 122, 124 of the first arm 104 and the second arm 106 such that the mouth 120 decreases in size relative to the inward movement. Conversely, an outward movement such as by releasing of the handle ends 108, 110 of the first and second arm 104, 106 respectively would urge a corresponding outward movement of the jaw ends 122, 124 of the first arm 104 and second arm 106 such that the mouth 120 increases in size relative to the outward movement. Inward movement and decrease in mouth size could allow for grasping while outward movement and corresponding increase in mouth size could allow for releasing of the oil cap 10.

With reference to FIG. 2, it can be seen in this particular embodiment the first gripping surface 180 and second gripping surface 181 have a serrated pattern. Similarly, the third gripping surface 200 and fourth gripping surface 201 also have a serrated pattern. Each of the serrations consist generally of peaks 172 with intervening valleys 174. The peaks 172 and valleys 174 of the first and second gripping surfaces 180 and 181 are oriented perpendicularly to the longitudinal axis of the oil filter removal tool 100, said longitudinal axis being defined as extending along the handle region 102. Conversely, the peaks 172 and valleys 174 of the third and fourth gripping surfaces 200 and 201 are oriented parallel to said longitudinal axis, and perpendicularly relative to the corresponding features on first and second gripping surfaces 180 and 181. This configuration of serrations, when combined with the previously described configuration of first and second jaw regions 116 and 118 relative to first and second terminal clamping elements 130 and 132, provides for a tool having excellent gripping ability and which has the versatility to securely grip an oil filter 10 from a variety of approaches and angles.

The serrations used for the gripping surfaces 180, 181, 200, and 201 may have varying profiles. For example, the peaks 172 may be spaced apart by some distance to provide wide flat valleys 174. Alternatively, the peaks 172 may run contiguously to provide for alternating peaks and valleys of the same width and depth. Although shown in some of the figures as a series of continuous peaks and troughs in a classical serration style, the serrated edge may also embody various profiles with peaks and troughs of varying width, depth, or shape as will be known to one with skill in the art. In still other embodiments, one or both of the peaks 172 and valleys 174 may be blunt edged or rounded. Any profile for the plurality of teeth that facilitates gripping will be usable as will be known to one with skill in the art.

First and second jaw regions 116 and 118 and first and second terminal clamping elements 130 and 132 may be connected to each other by any means known in the art. In the embodiment shown in FIGS. 1-11, it can be seen that the terminal clamping elements 130 and 132 are formed as separate pieces from the first and second jaw regions 116 and 118. These pieces may be subsequently riveted together in a variety of configurations. For example, as seen in FIG. 1, the jaw regions 116, 118, may be formed of two parallel joined plates that deviate outwardly at the mouth ends 122, 124 to provide a mounting surface. On the mounting surface of the mouth ends 122, 124, the terminal clamping elements 130, 132 may be mounted orthogonally relative to the jaw regions 116, 118 to provide the hammerhead profile 134 to the mouth 120. Alternatively, the mounting surface could be formed by a single surface extending transversely relative to the jaw region which itself could be a single plate. Means for mounting could include screws, bolts, welding, adhesives or any other form of joinery as will be known to one with skill in the art.

In other embodiments, such as is shown later in FIGS. 12-17, first and second terminal clamping elements 130 and 132 may be molded to be integral with first and second jaw regions 116 and 118.

First and second jaw regions 116 and 118 and first and second terminal clamping elements 130 and 132 may be made of any material that imparts strength and rigidity for routine operation. For example, they may be made from steel, and may be stamped, forged, or cast. Generally, the material used should be stronger and harder than the metals typically used to manufacture the outer surface of oil filter 10, so that if serrated gripping surfaces 180, 181, 200 and

201 are used, the peaks 172 thereon may lightly dent the surface of the oil filter 10 to provide a stronger grip. As spent oil filters 10 are generally discarded after use, there is little concern about minor denting of the surface upon removal.

Gripping surfaces 180, 181, 200, and 201 may not take the form of serrated metal surfaces. Any material that adequately increases the gripping strength of the oil filter removal tool, for example a serrated hard polymer, or a rubber surface which may not be serrated, may be effective to provide the grip required. Serrated metal surfaces are particularly advantageous as they tend to maintain their ability to provide a strong grip on oil filters 10 even with repeated use. As oil filters 10 get dirty and greasy after installation, alternate materials for the gripping surfaces may not work as well as steel with repeated use due to accumulation of grease and dirt along gripping surfaces 180, 181, 200, and 201.

Figure 5:
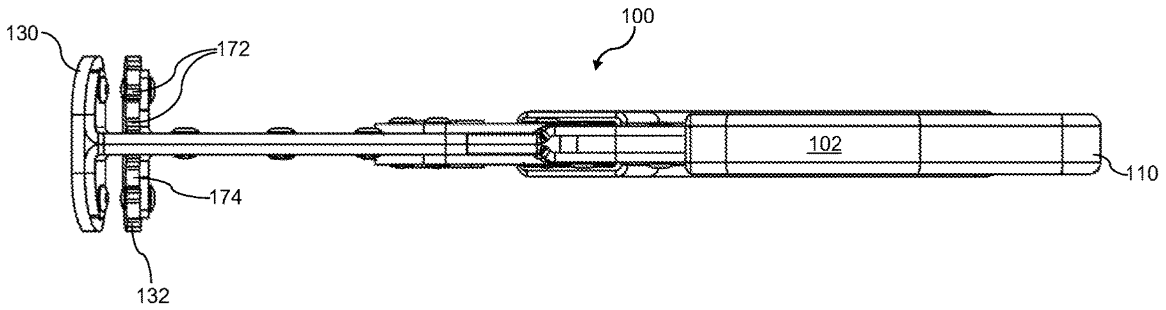
FIG. 5 shows a top plan view of the oil filter removal tool of FIG. 1.
Figure 6:
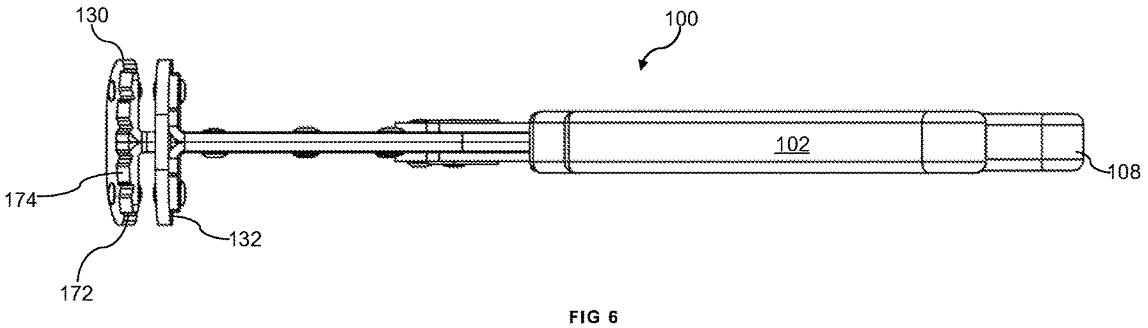
FIG. 6 shows a bottom plan view of the oil filter removal tool of FIG. 1.
Figure 7:
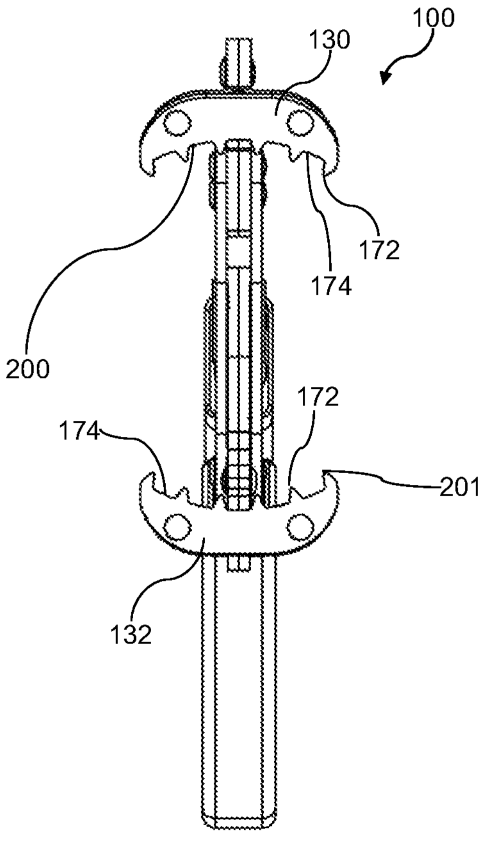
FIG. 7 shows front elevation view of the oil filter removal tool of FIG. 1.
Figure 8:
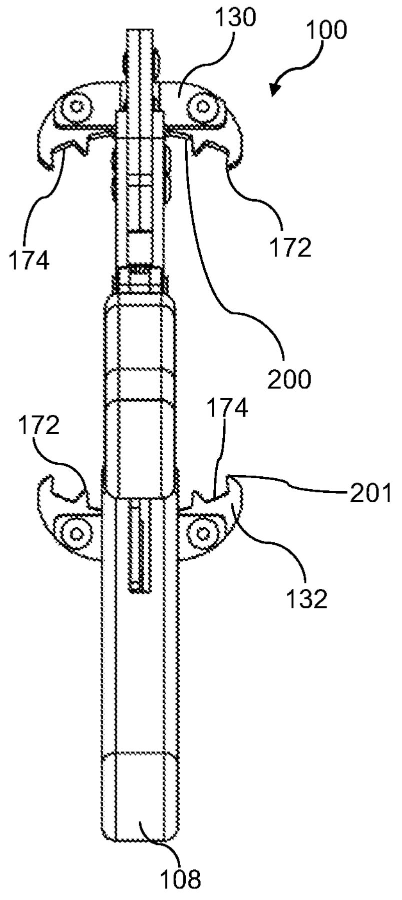
FIG. 8 shows a rear elevation view of the oil filter removal tool of FIG. 1.
Figure 9:
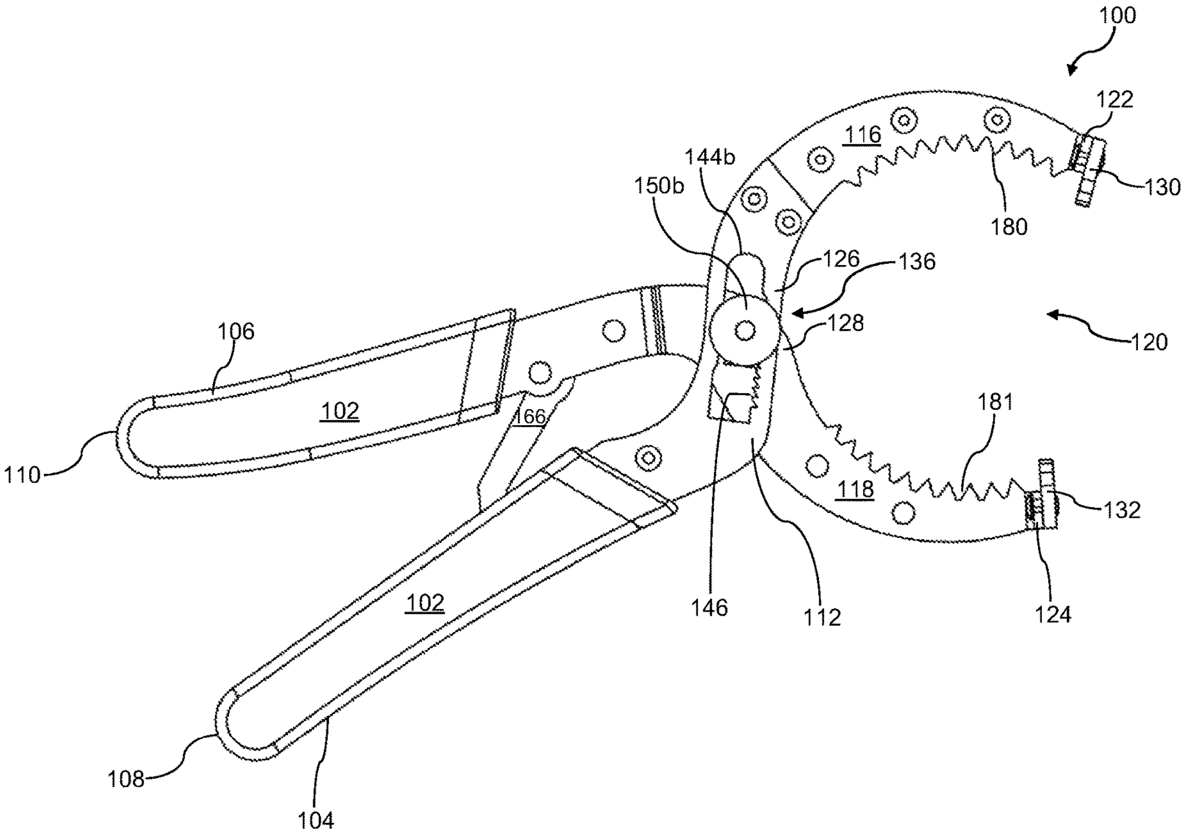
FIG. 9 shows a side elevation view of the oil filter removal tool of FIG. 1.
Figure 10:
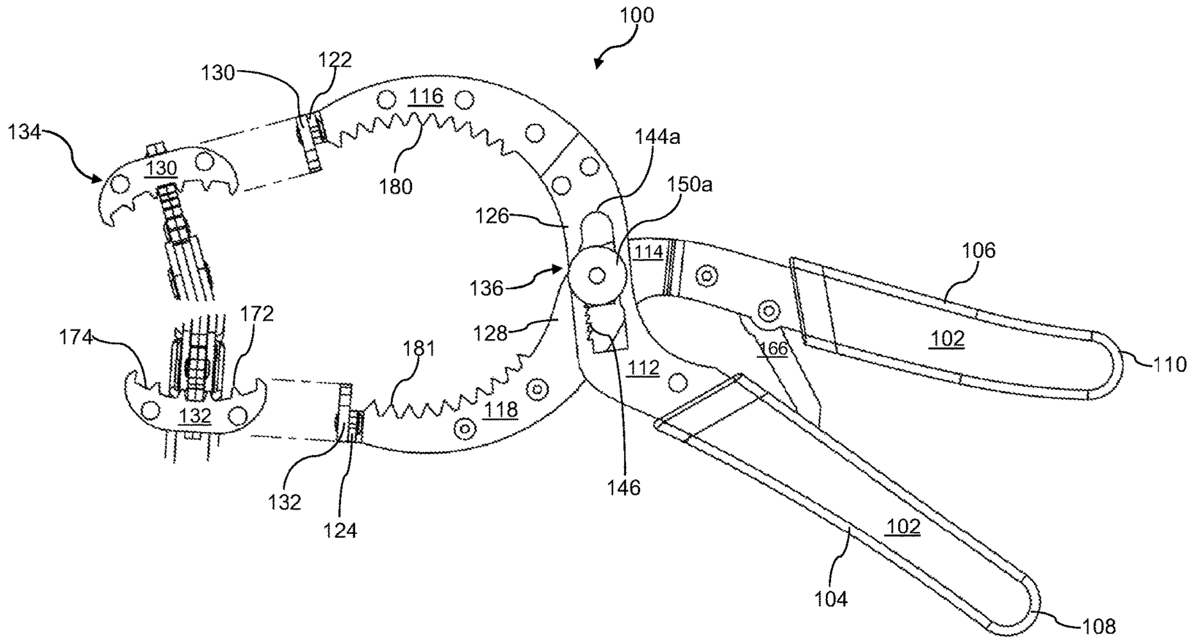
FIG. 10 shows an alternate side elevation view of the oil filter removal tool of FIG. 1, with a breakaway front view of the hammerhead profile of the mouth.

FIGS. 5 and 6 show top and bottom plan views respectively of the embodiment of oil filter removal tool 100 seen in FIGS. 1-4. FIGS. 7 and 8 respectively show front and rear perspective views of the embodiment of the oil filter removal tool 100 seen in FIGS. 1-4. FIGS. 9 and 10 provide left and right side views of the embodiment of the oil filter removal tool 100 seen in the preceding figures. The handle ends 108 and 110 and their relationship to the described components of mouth 120 detailed above can be clearly seen in these figures. In this embodiment, first arm 104 is pivotably connected at a crossover portion 136 to the second arm 106 at the neck regions 112, 114. The pivotable connection at the crossover portion 136 functions with scissor-like movement to adjust the opening of the mouth 120.

At least one of the handle ends 108 and 110 (of the first and second arm 104, 106 respectively) is inwardly moveable relative to the other of the handle ends 108, 110 (of the first and second arm 104, 106) to urge a corresponding inward movement of at least one of the connecting neck regions, 112, 114 of the first arm and the second arm 104, 106 such that the mouth 120 decreases in size relative to the inward movement. In some embodiments, only one of first and second arms 104, 106 may be inwardly moveable.

Referring to FIGS. 1 and 2, it can be seen that in this particular embodiment, second arm 106 and its connected neck region 114 are encased by first arm 104 at the crossover portion 136, such that the encasing first arm 104 has a first prong 104*a* at a one side, and a second prong 104*b* at another side. In other words, second arm 106 is nestled between first and second prongs 104*a* and 104*b*, and has two opposing sides 106*a* and 106*b*. Second arm 106 is outfitted at its connected neck region 114 with two washers 150*a* and 150*b* that fit within parallel complementary guide tracks 144*a* and 144*b* positioned respectively in the first and second prongs 104*a* and 104*b*. The guide tracks 144*a*, 144*b*, in this illustrated embodiment are elongated apertures having a ratchet profile 146 for releasably locking a pawl 160 (not shown in FIG. 1 or 2, but visible in FIG. 11) internal to washers 150*a* and 150*b*. The ratchet profile 146 may only be formed on a portion of the elongated apertures 144*a*, 144*b* as shown in the illustrated embodiment.

In this embodiment, the ratchet profile 146 on the guiding tracks 144*a*, 144*b* is configured to provide a plurality of distinct positions, such that each distinct position corresponds to a size for the mouth 120. These distinct positions are achieved by the pawl 160 disposed between the washers 150*a*, 150*b*, and the second arm 106 for releasably locking with the guide tracks 144*a* and 144*b*, and specifically with the ratchet profile 146. Therefore, the ratchet profile 146 on the elongated slot 140 releasably receives the pawl 160 in a plurality of distinct positions, such that each distinct position corresponds to a size for mouth 120.

Figure 11:
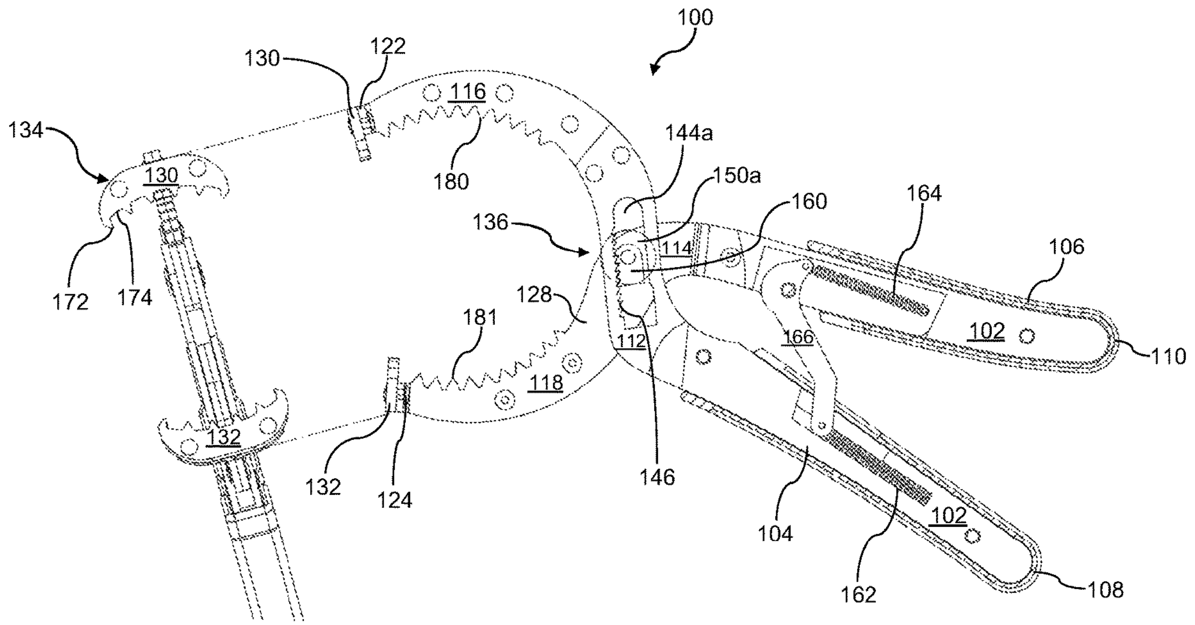
FIG. 11 shows the oil filter removal tool of FIG. 10 with a cutout showing a swing link pivot mechanism on the biasing elements disposed on the each of the handle regions.
Figure 12:
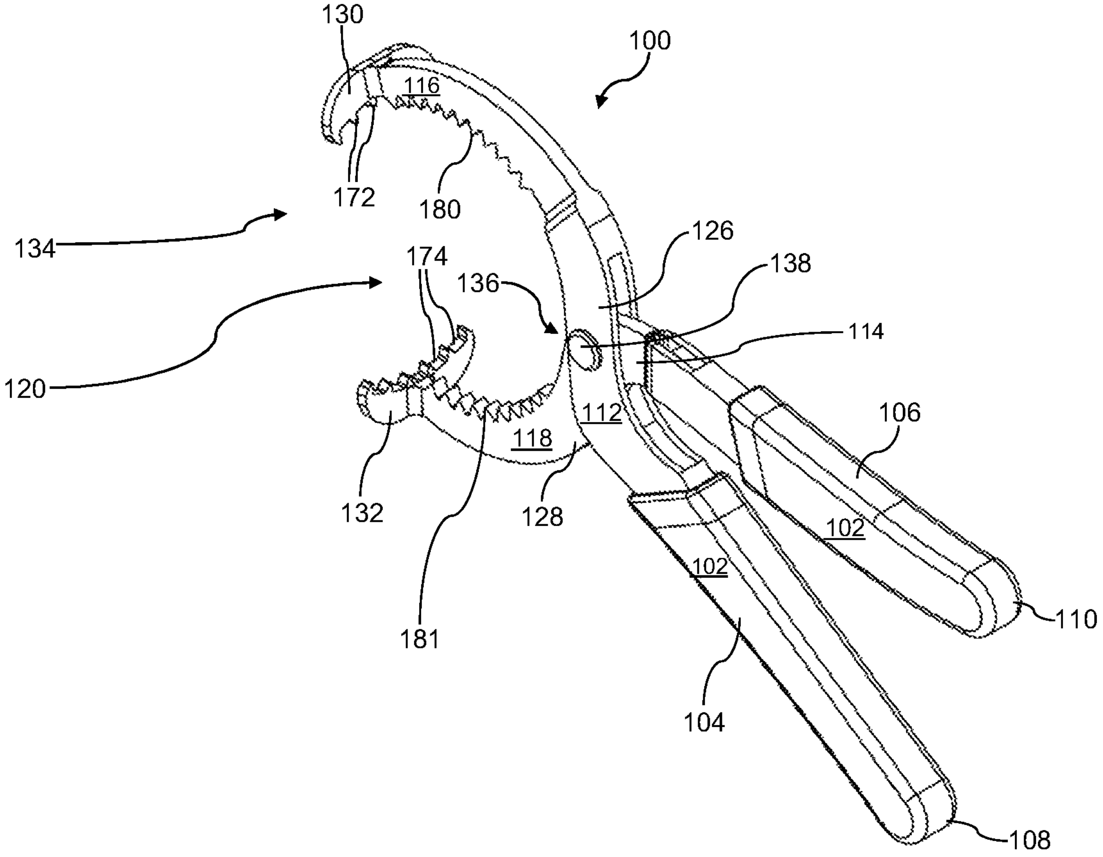
FIG. 12 shows a perspective view of an illustrative oil filter removal tool having a fixed pivot point according to another aspect of the present disclosure.
Figure 13:
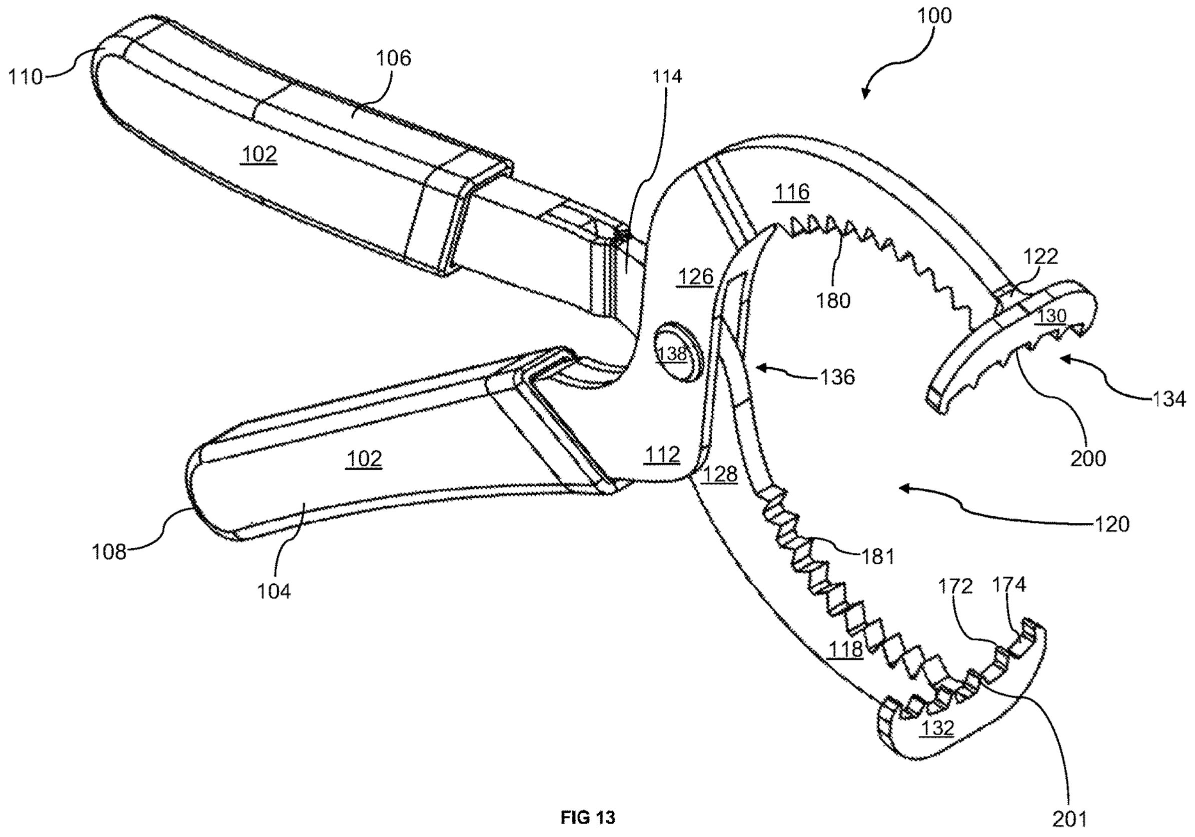
FIG. 13 shows an alternative perspective view of the oil filter removal tool of FIG. 12.
Figure 14:
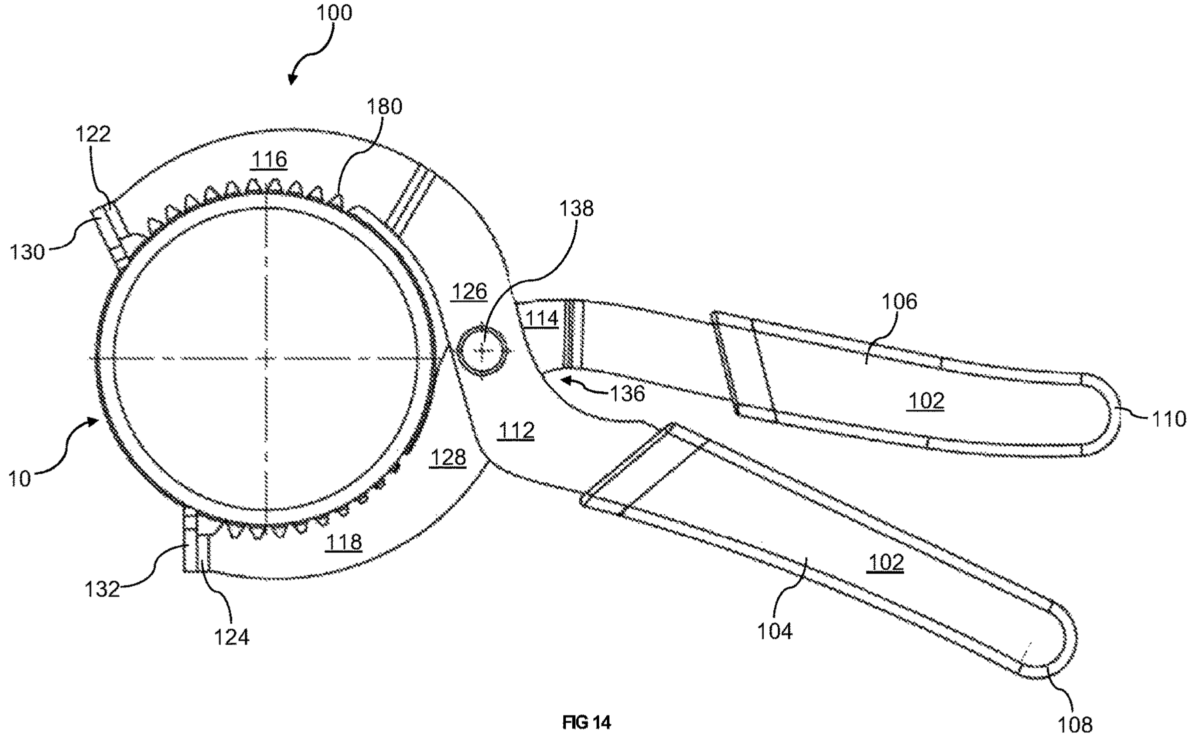
FIG. 14 shows a side elevation view of the oil filter removal tool of FIG. 12 in use with a radial approach relative to the oil filter.
Figure 15:
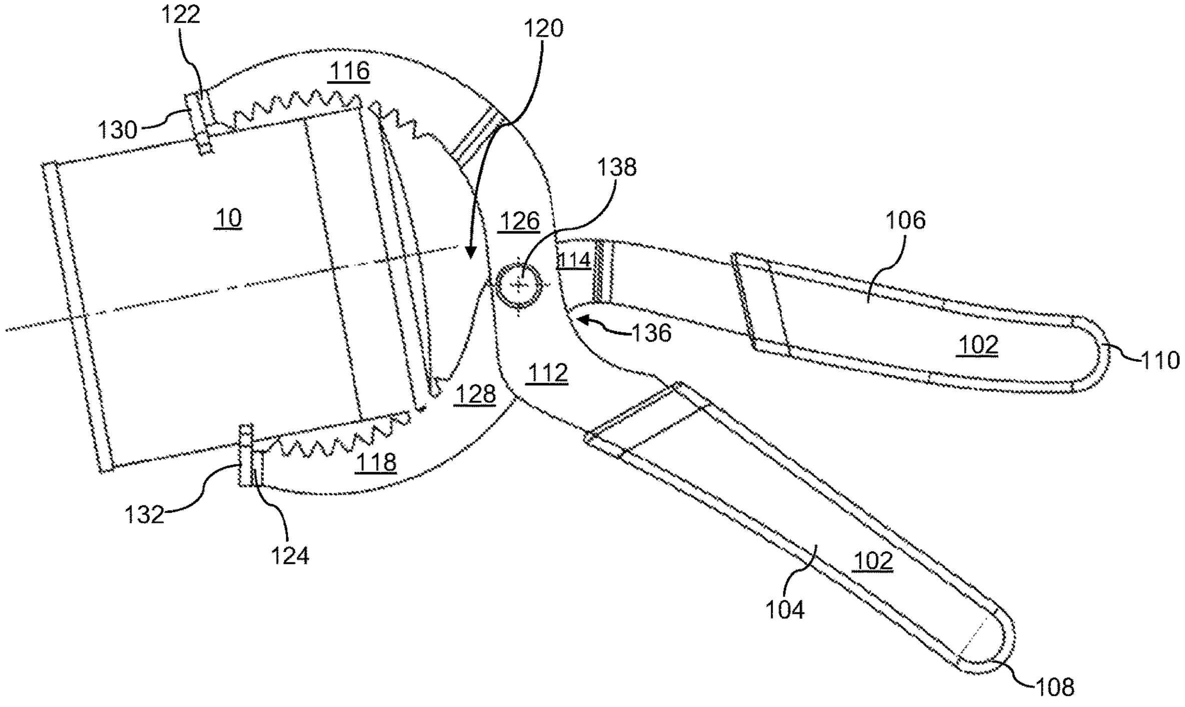
FIG. 15 shows a side elevation view of the oil filter removal tool of FIG. 12 in use with an axial approach relative to the oil filter.
Figure 16:
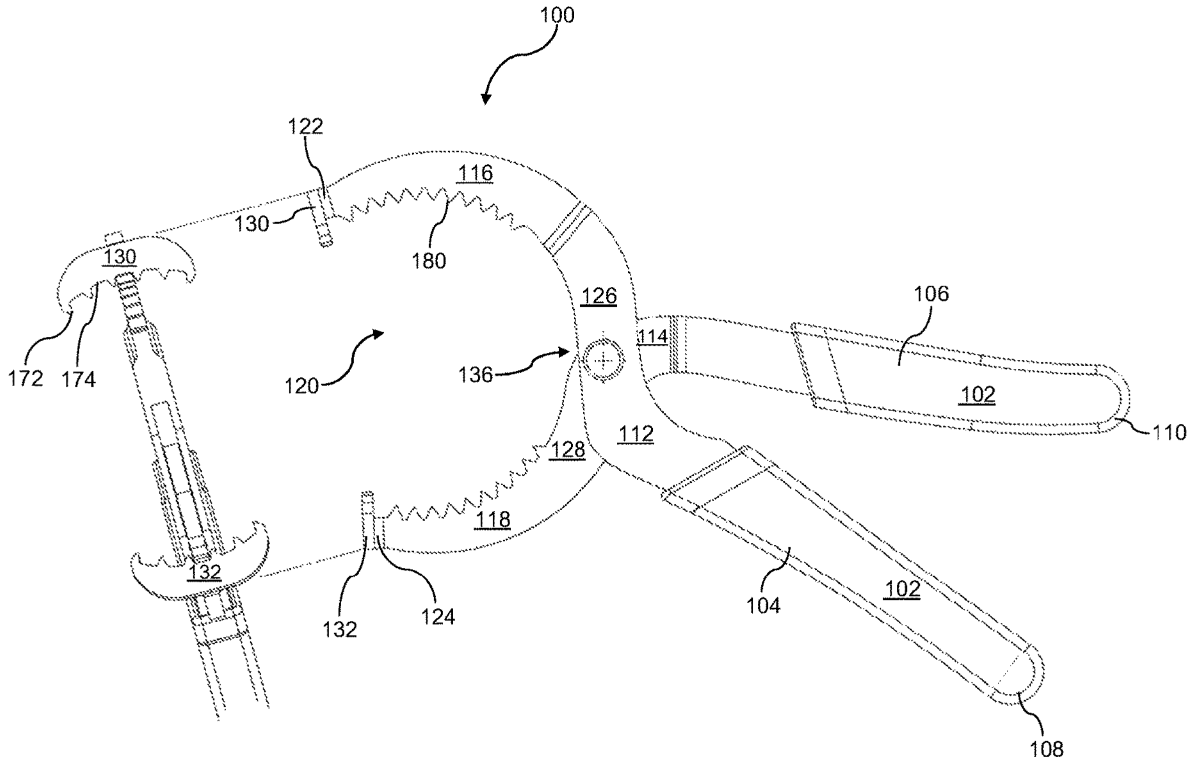
FIG. 16 shows an alternate side elevation view of the oil filter removal tool of FIG. 12 with an additional front elevation view of the hammerhead profile of the mouth.
Figure 17:
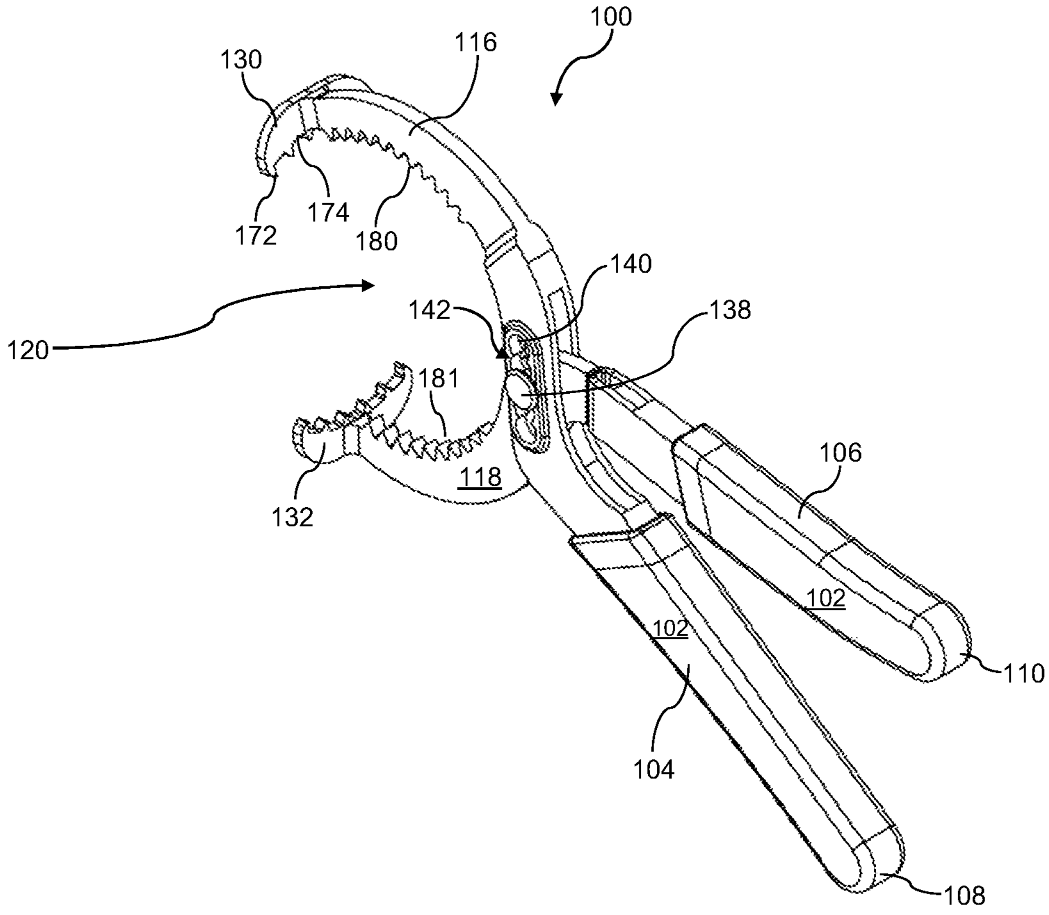
FIG. 17 shows a perspective view of an illustrative oil filter removal tool having an adjustable slip joint pivot point according to another aspect of the present disclosure.
Figure 18:
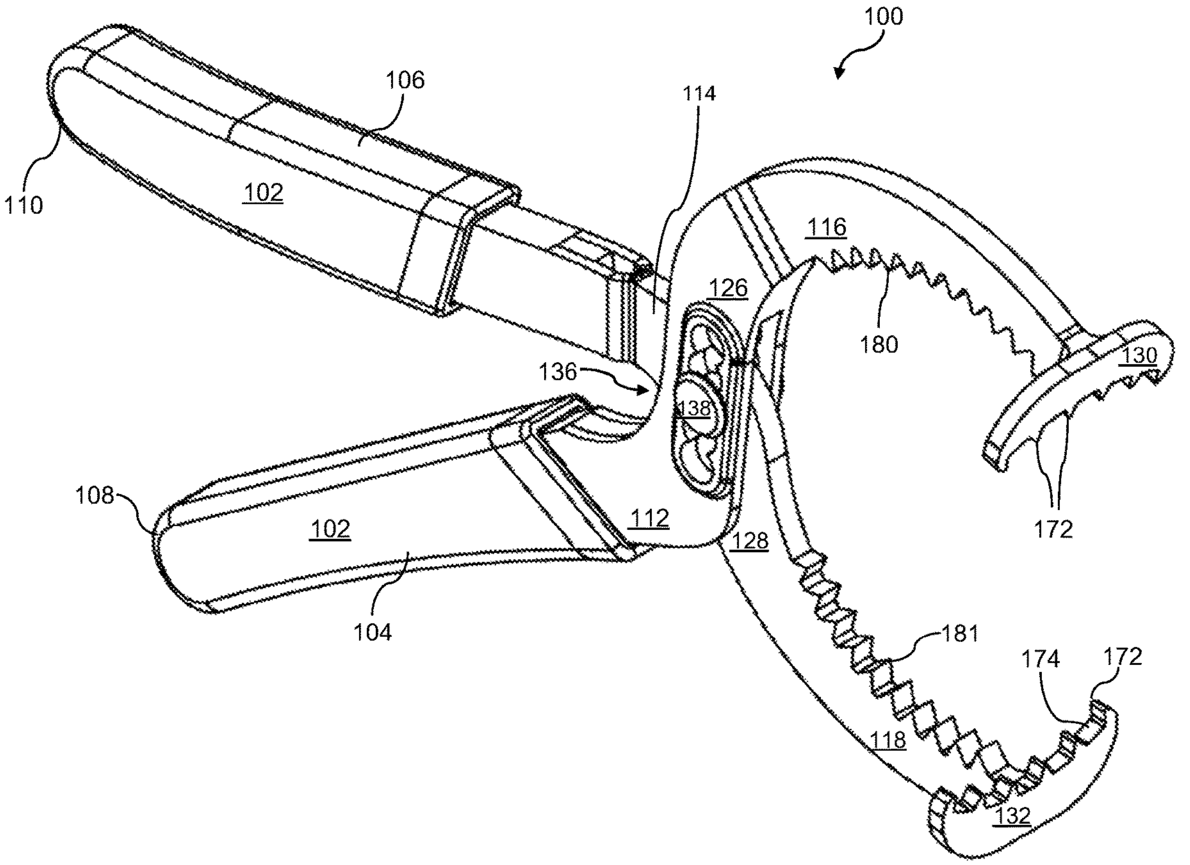
FIG. 18 shows an alternative perspective view of the oil filter removal tool of FIG. 17.
Figure 19:
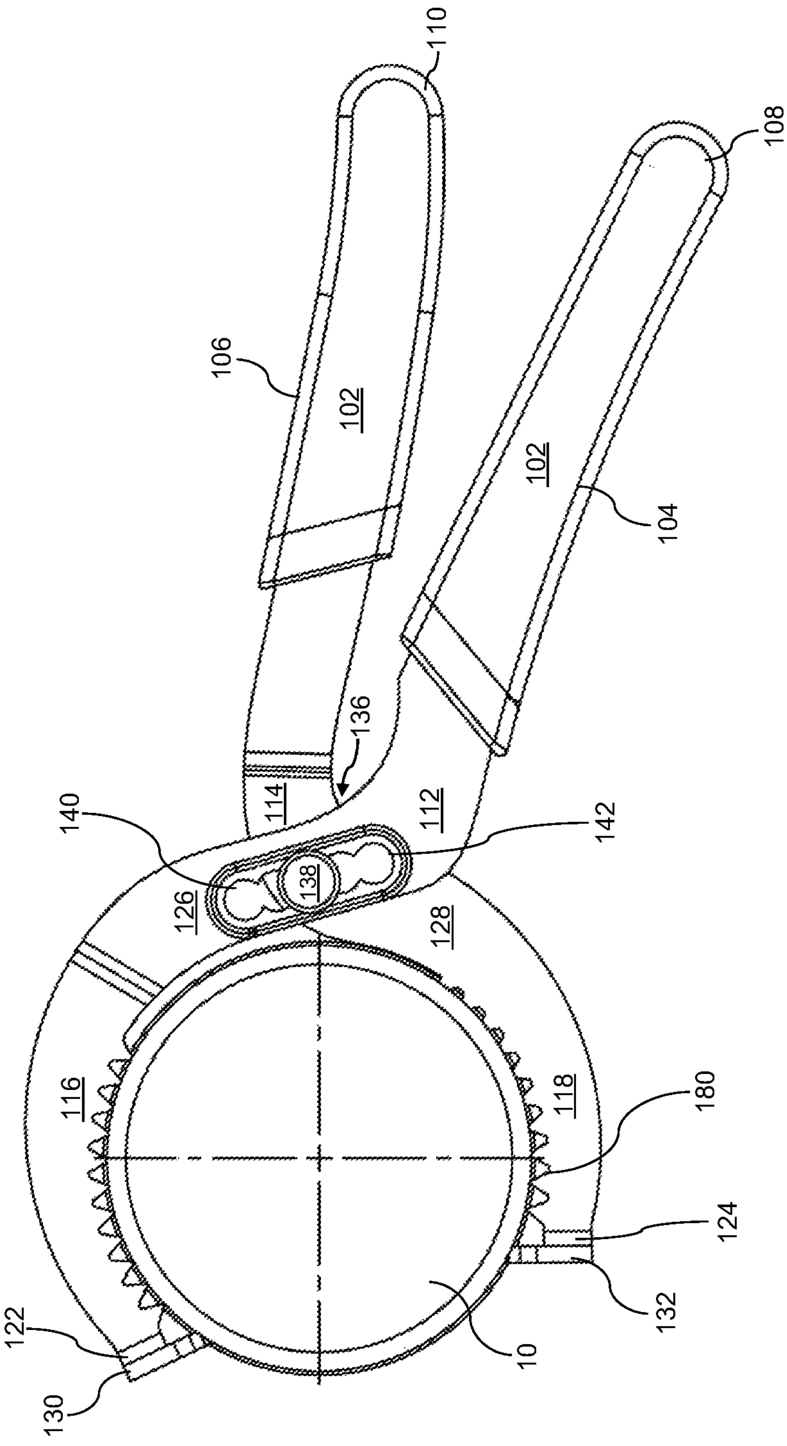
FIG. 19 shows a side elevation view of the oil filter removal tool of FIG. 17 in use with a radial approach relative to the oil filter.
Figure 20:
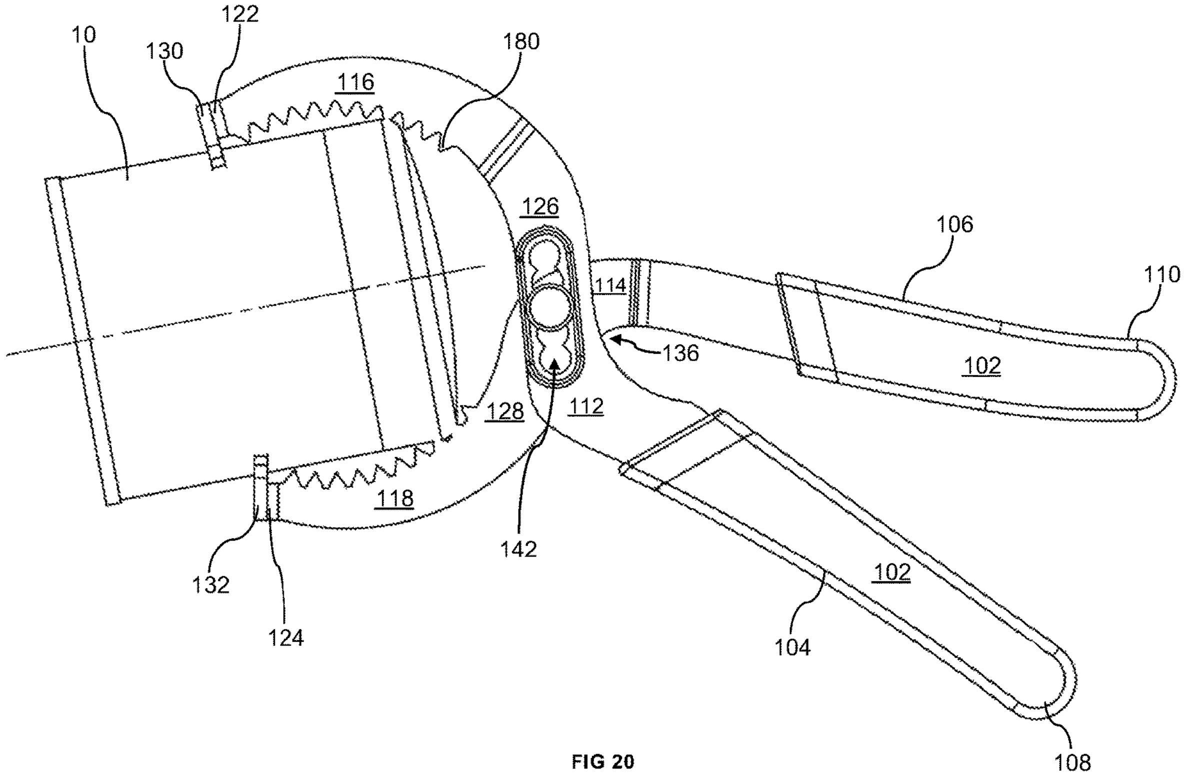
FIG. 20 shows a side elevation view of the oil filter removal tool of FIG. 17 in use with an axial approach relative to the oil filter.
Figure 21:
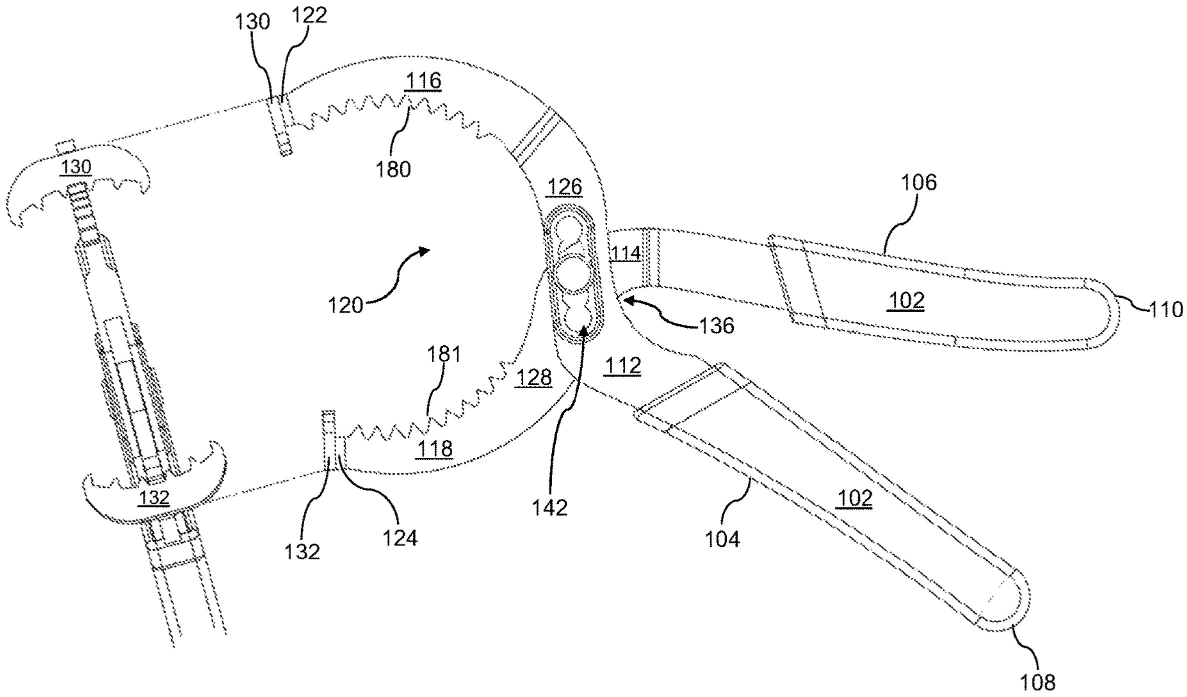
FIG. 21 shows an alternate side elevation view of the oil filter removal tool of FIG. 17 with an additional front elevation view of the hammerhead profile of the mouth.
Figure 22:
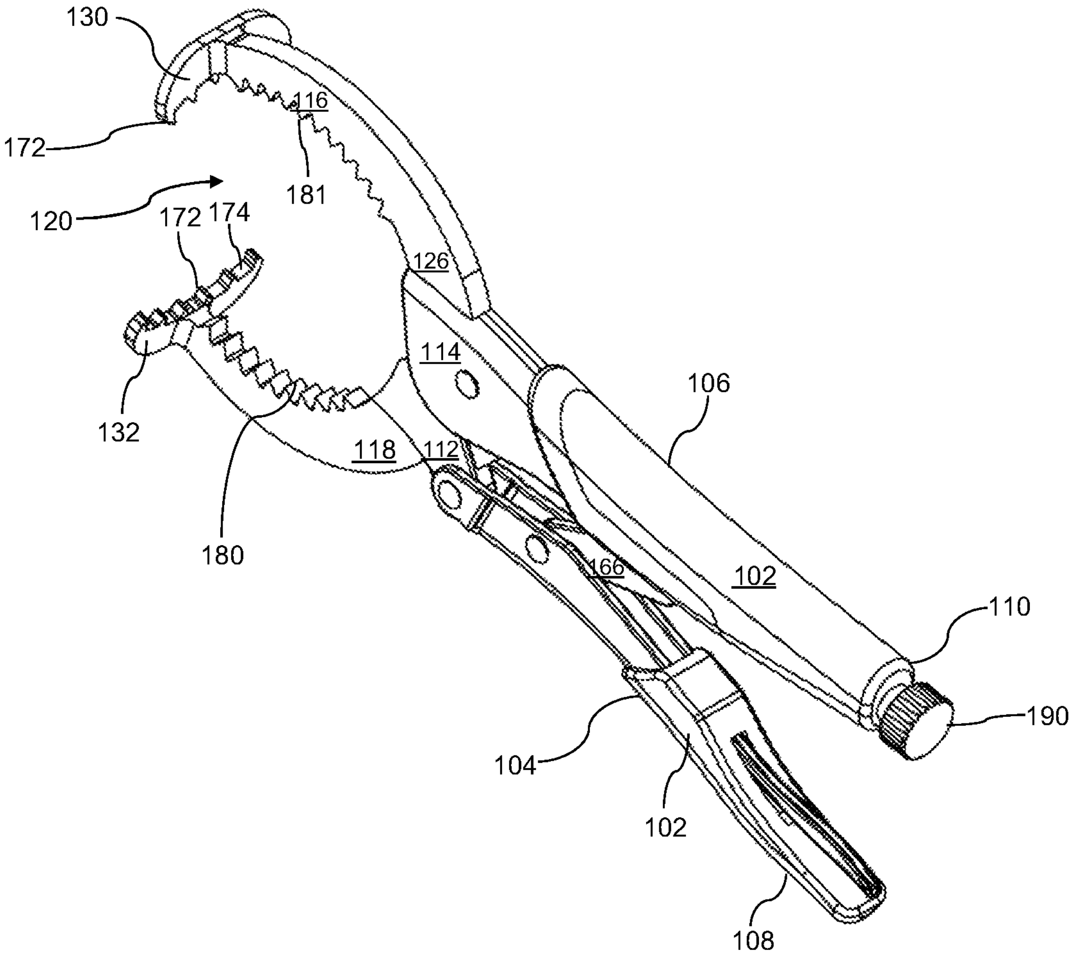
FIG. 22 shows a perspective view of an illustrative oil filter removal tool having vise-grip-style locking plier handles according to another aspect of the present disclosure.
Figure 23:
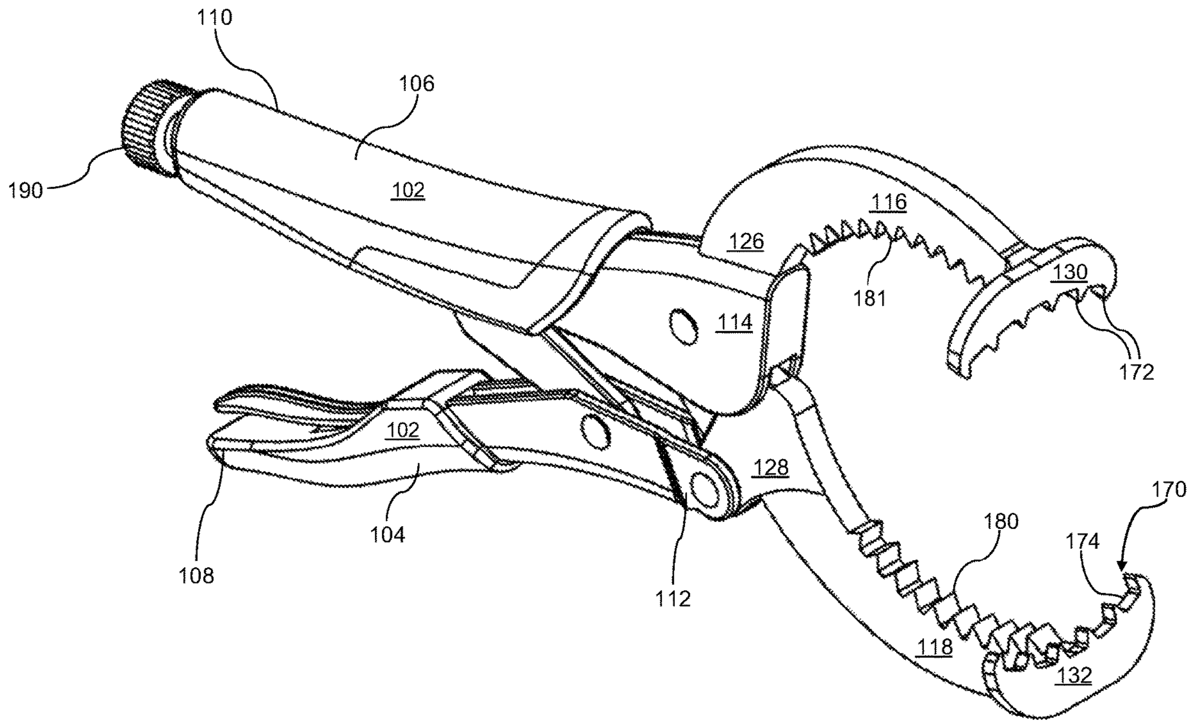
FIG. 23 shows an alternative perspective view of the oil filter removal tool of FIG. 22.
Figure 24:
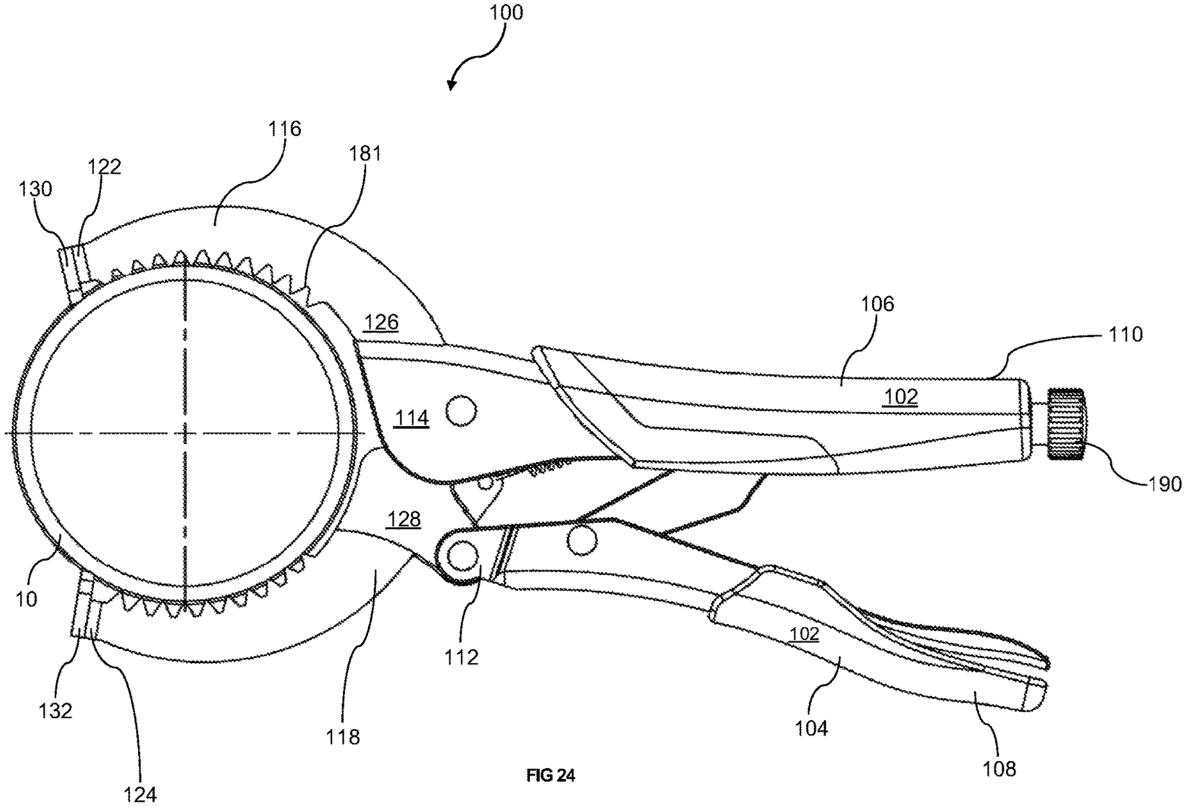
FIG. 24 shows a side elevation view of the oil filter removal tool of FIG. 22 in use with a radial approach relative to the oil filter.
Figure 25:
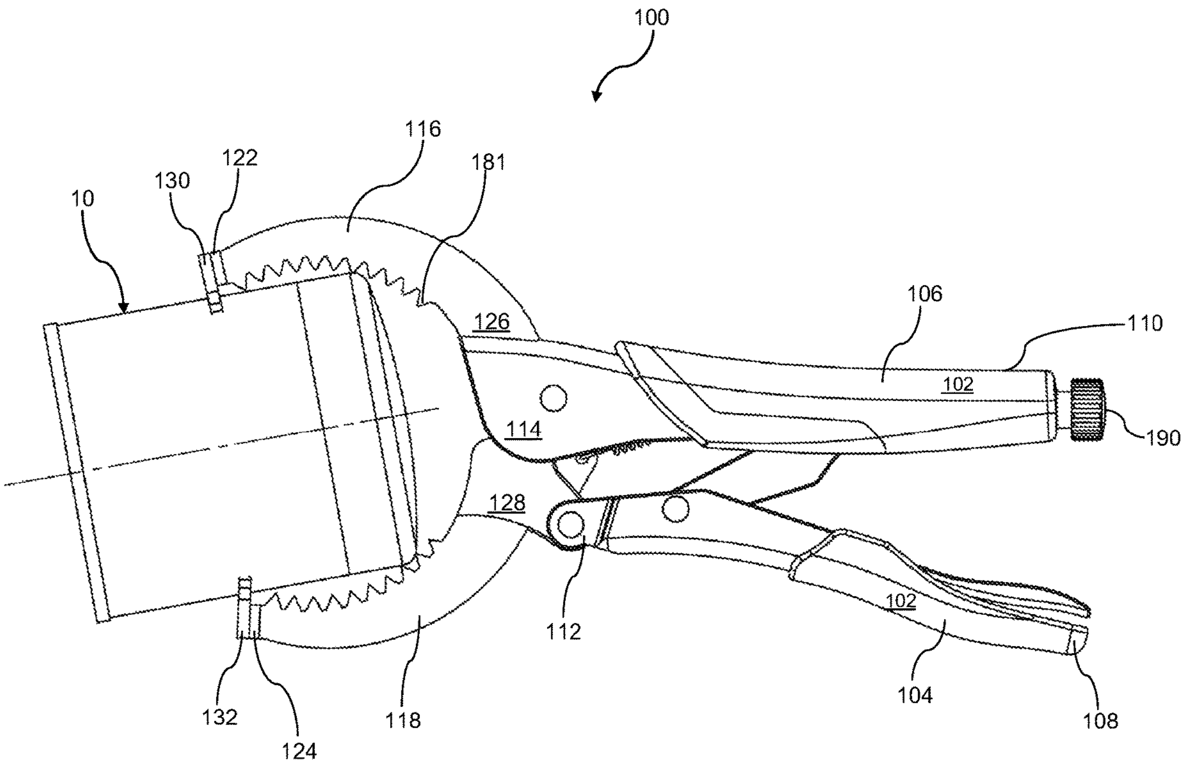
FIG. 25 shows a side elevation view of the oil filter removal tool of FIG. 22 in use with an axial approach relative to the oil filter.
Figure 26:
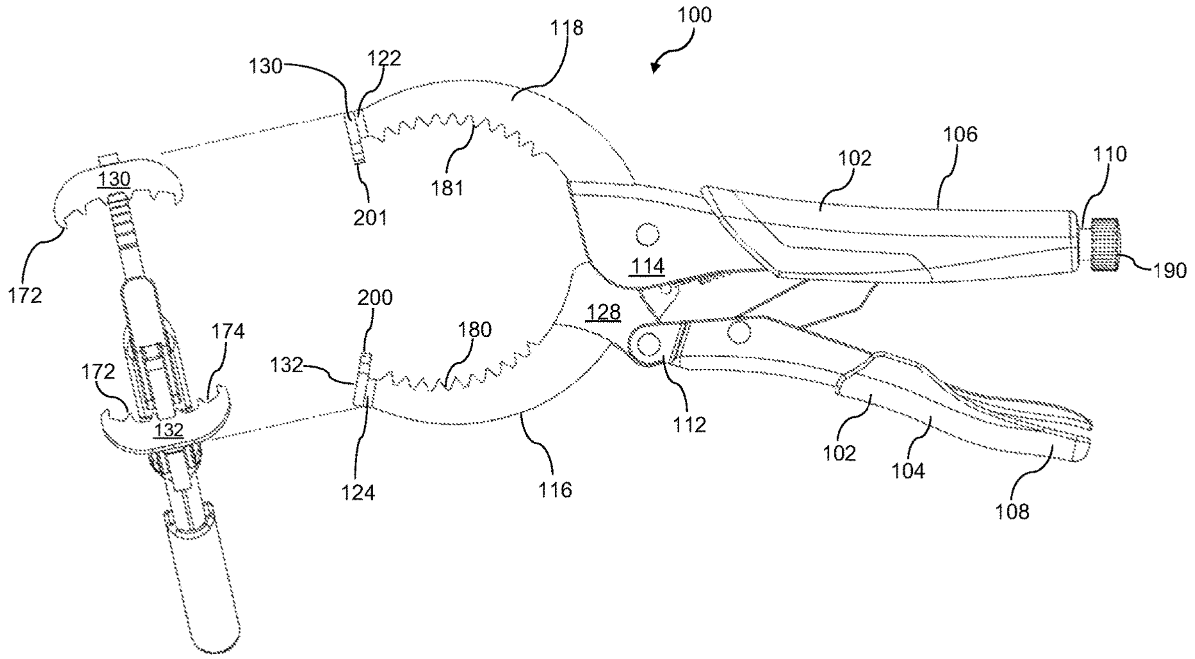
FIG. 26 shows an alternate side elevation view of the oil filter removal tool of FIG. 22 with an additional front elevation view of the hammerhead profile of the mouth.
Figure 27:
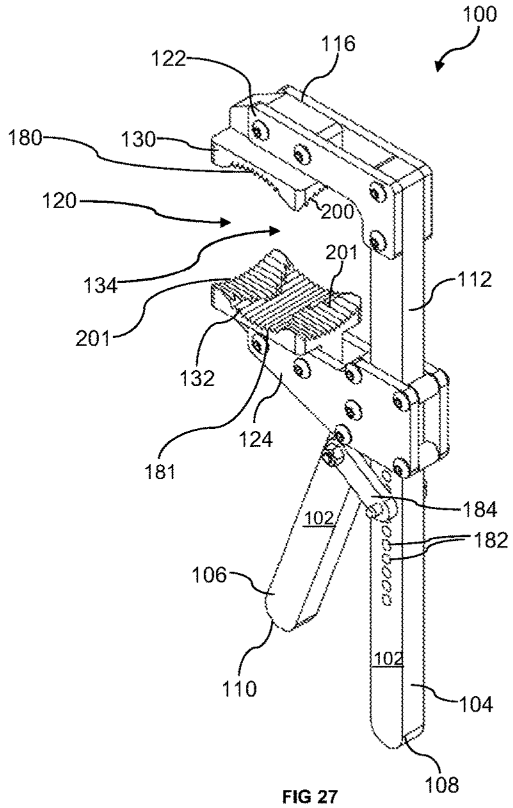
FIG. 27 shows a perspective view of an illustrative oil filter removal tool having a swing link pivot connection according to another aspect of the present disclosure.
Figure 28:
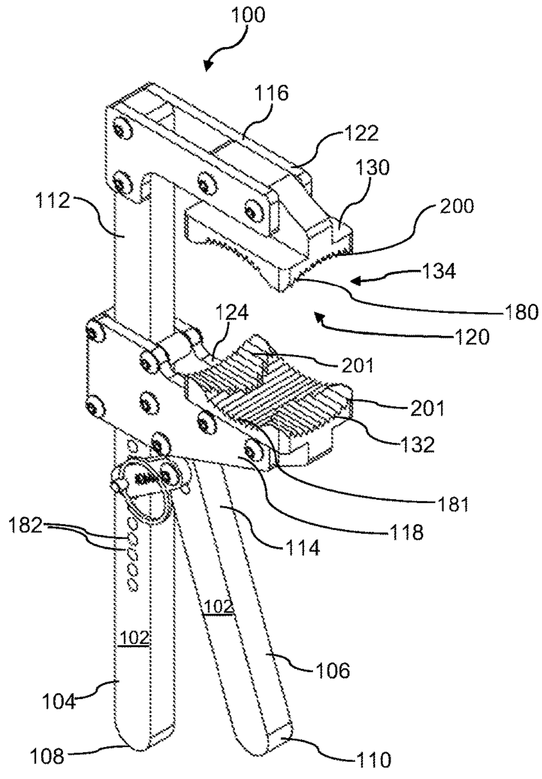
FIG. 28 shows an alternative perspective view of the oil filter removal tool of FIG. 27.

As shown in greater detail in FIG. 11, the handle region 102 of oil filter removal tool 100 may also comprise biasing elements. A first biasing element and a second biasing element may urge the mouth into the plurality of distinct positions as defined by the plurality of distinct positions of each serration guide track serration 146. One of the first biasing element and the second biasing element may be a compression spring and the other of the first biasing element and the second element may be a tension spring. In the illustrated embodiments, the first biasing element is a compression spring 162 on the first arm 104, and the second biasing element is a tension spring 164 on the second arm 106. In the illustrated embodiments, a swing link 166 pivotably connects the compression spring 162 and the tension spring 164 for biasing the mouth 120 in one of the plurality of distinct positions.

In various embodiments, one of the arms 104, 106 could be stationary and the other moveable with respect to it. In another embodiment, both the first arm and the second arm 104, 106 could be moveable relative to the other. As shown in the illustrated embodiments, the oil filter removal tool 100 may be used in a left-handed or right-handed configuration; either of the handle ends 108, 110 may be squeezed to urge the movement of the respective jaw regions 116, 118 inward to reduce the mouth 120 size and aid in grasping of the oil filter 10.

To further facilitate gripping, the handle ends 108, 110 may be coated with a non-slip covering, such as a textured or rubberized surface that may be installed as a separate cover thereon or which may be used as a coating. For example, an epoxy or polymer coating could be used. In other embodiments, the handles could be made of injection molded plastic. Any other suitable material may also be used as will be known to one with skill in the art.

FIGS. 12-17 show an alternate embodiment for the handle region 102, with first arm 104 and second arm 106 connected at the crossover portion 136 by a single pivot pin 138, which serves as a fixed pivot point. The pivot pin 138 extends therethrough for pivoting the first arm 104 relative to the second arm 106 for varying the size of mouth 120. This fixed pivot point may be achieved by a single pin 138 engaged in corresponding apertures extending at least partially through the first and second arms at the crossover portion 136 for engaging the first and second arms 104, 106 as illustrated. The fixed pivot point may include bearings, washers, or other parts to facilitate provision of a pivot point as will be known to one with skill in the art.

Referring now to FIGS. 17-21, in another embodiment, the first arm 104 may be pivotably connected at a crossover portion 136 to the second arm 106 by means of an adjustable pivot pin 138 to alter the size of the mouth 120. The pivot pin may be adjustable by slidable movement to a plurality of cutouts 142 defining distinct positions within a corresponding elongated slot 140 for slidably receiving pivot pin 138, and extending through the crossover portion 136. Cutouts 142 may have a generally circular circumference for slidably receiving the pivot pin 138 and for ease of sliding the pivot pin 138 as shown. Alternate cutout profiles and pivot pin profiles may also be used as will be known to one with skill in the art.

Instead of a crossover-style connection as shown in several of the preceding embodiments, the jaw regions 116 and 118 may alternatively extend respectively from the first and second arms 104 and 106. Referring specifically to FIGS. 22-26, the mouth may be locked into position using an "over-center" cam action similar to that of locking pliers as shown or Vise-Grips™. This embodiment employs an adjustor screw 190. By locking the tool using adjustor screw 190, the mouth 120 will be limited in closing beyond the set point. Variations of these handle mechanisms are well known in the art, and any such handle mechanism is contemplated.

In a further embodiment shown in FIGS. 27-32, a first arm 104 has a plurality of spaced apart apertures 182 on its handle for receiving a swing link pivot bridge 184 extending from the second arm 106 to vary the size of mouth 120. The swing link pivot bridge 184 can be indexed to a suitable one of the plurality of spaced apart apertures 182 to accommodate the diameter of oil filter 10. Other similar mechanisms for releasably locking mouth 120 in a plurality of distinct positions can also be used as will be known to one with skill in the art.

Figure 29:
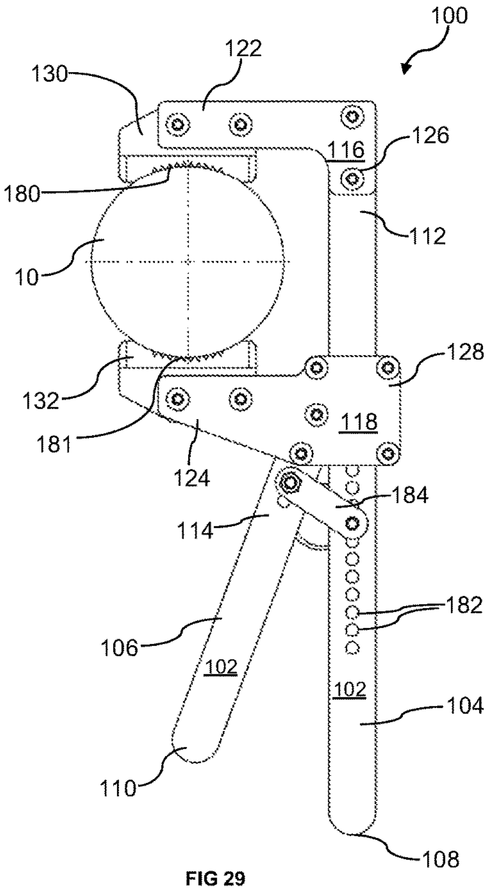
FIG. 29 shows a side elevation view of the oil filter removal tool of FIG. 27 in use with a radial approach relative to the oil filter.
Figure 30:
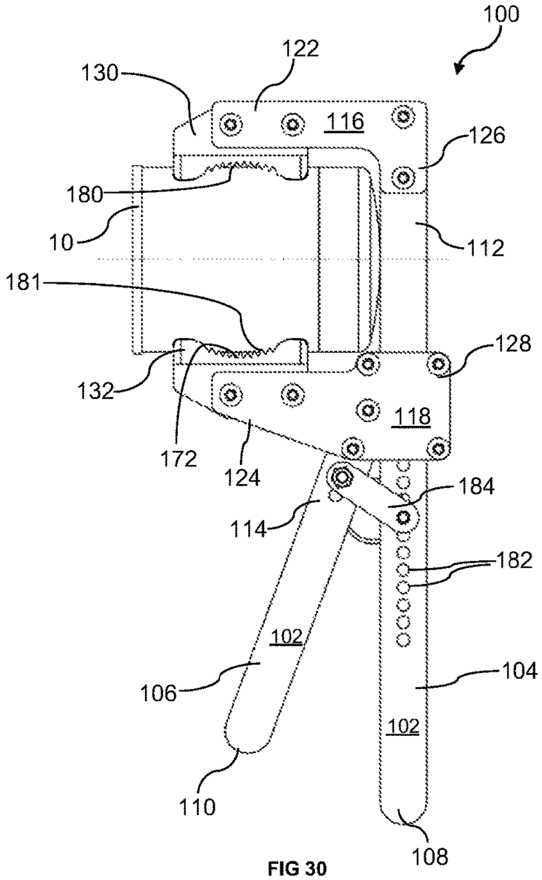
FIG. 30 shows a side elevation view of the oil filter removal tool of FIG. 27 in use with an axial approach relative to the oil filter.
Figure 31:
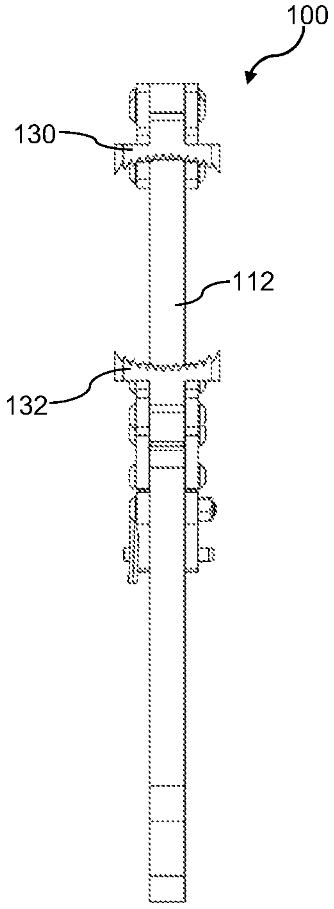
FIG. 31 shows a front elevation view of the oil filter removal tool of FIG. 27.
Figure 32:
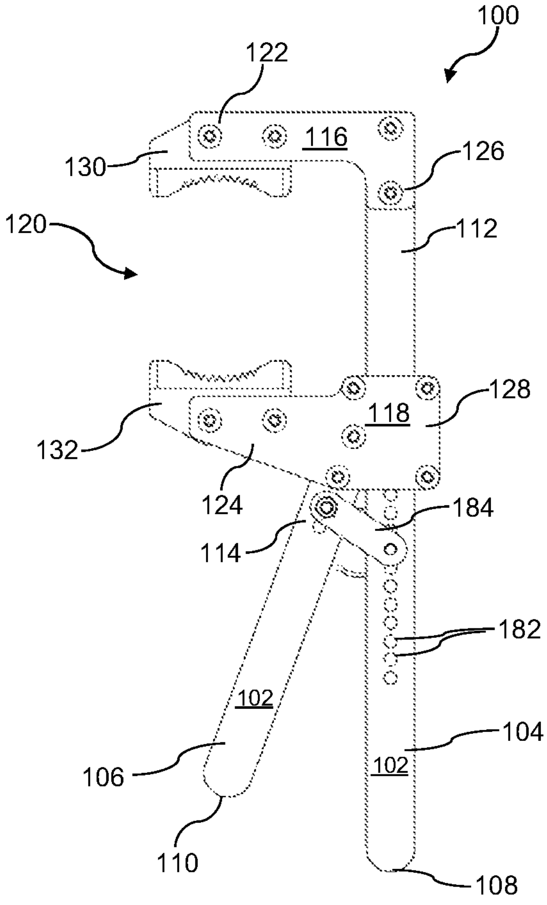
FIG. 32 shows a side elevation view of the oil filter removal tool of FIG. 27.

The embodiment shown in FIGS. 27-32 also shows an alternate configuration for the gripping surfaces 180, 181, 200, and 201. Said gripping surfaces may alternatively be formed to be directly adjacent to each other as shown, with the two sets of serrated gripping surfaces 180, 181, 200, and 201 being oriented perpendicularly to each other in the same manner as seen in the earlier embodiments. The larger surface area may provide a stronger grip as a greater proportion of the surface of oil filter 10 will be engaged, as shown in FIGS. 29 and 30.

The serrated gripping surfaces 180, 181, 200 and 201 in FIGS. 27-32 are shown as having peaks 172 of varying lengths extending in opposing directions across the surface area to help facilitate gripping. The series of peaks 172 have curved profiles to facilitate receiving the cylindrical oil filter. As seen in FIGS. 29 and 30, mouth 120 can accommodate an oil filter 10 in either a radial or axial approach as described previously for other embodiments.

Several currently preferred embodiments have been described by way of example. It will be apparent to persons skilled in the art that a number of variations and modifications can be made without departing from the scope of the invention as defined in the claims.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. Thus, it should be understood, therefore, that the invention may be practiced otherwise than as specifically set forth herein.

PARTS LIST

| | |
|---|---|
| 10 | oil filter |
| 100 | oil filter removal tool |
| 102 | handle region |
| 120 | mouth |
| 136 | crossover portion |
| 138 | pivot pin |
| 140 | elongated slot |
| 142 | cutouts |
| 144a | first guide track |
| 144b | second guide track |
| 146 | ratchet profile |
| 150a | first washer |
| 150b | second washer |
| 160 | pawl |
| 162 | compression spring |
| 164 | tension spring |
| 166 | swing link |
| 172 | peak |
| 174 | valley |
| 182 | aperture |
| 184 | swing link pivot bridge |
| 190 | adjustor screw |
| 104 | first arm |
| 104a | first prong |
| 104b | second prong |
| 108 | handle end (first arm) |
| 112 | neck region (first arm) |
| 116 | jaw region (first arm) |
| 122 | jaw end (first arm) |
| 126 | jaw base end (first arm) |
| 130 | terminal clamping element (first arm) |
| 180 | first gripping surface |
| 200 | third gripping surface |
| 106 | second arm |
| 106a | first side of second arm |
| 106b | second side of second arm |
| 110 | handle end (second arm) |
| 114 | neck region (second arm) |
| 118 | jaw region (second arm) |
| 124 | jaw end (second arm) |
| 128 | jaw base end (second arm) |
| 132 | terminal clamping element (second arm) |
| 181 | second gripping surface |
| 201 | fourth gripping surface |

What is claimed is:

1. An oil filter removal tool comprising:

two opposing jaws each having first and second ends, each said jaw forming a first curved gripping surface and a second curved gripping surface, respectively, said first and second gripping surfaces forming a mouth for radially receiving an oil filter, two opposing handles respectively connected to said second ends, said handles defining a longitudinal axis of said tool; and terminal clamping elements extending orthogonally from each respective first end of the opposing jaws, the terminal clamping elements being shaped to have a hammerhead profile, said terminal clamping elements forming a third curved gripping surface and a fourth curved gripping surface along a respective inner edge thereof, said terminal clamping elements being perpendicular to said longitudinal axis of said tool;

wherein said two opposing handles are inwardly moveable relative to each other to urge a corresponding inward movement of said two opposing jaws towards each other; and wherein said third and fourth gripping surfaces are arranged to grip said oil filter along a longitudinal axis of the oil filter.

2. The oil filter removal tool of claim 1, wherein said first and second gripping surfaces are serrated.

3. The oil filter removal tool of claim 1, wherein said third and fourth gripping surfaces are serrated.

4. The oil filter removal tool of claim 1, wherein said opposing handles are joined by a pivotable connection.

5. The oil filter removal tool of claim 4, wherein said pivotable connection includes a track having a plurality of defined positions at which said opposing handles may pivot.

6. The oil filter removal tool of claim 1, further comprising biasing elements connected to said handles.

7. The oil filter removal tool of claim 1, wherein said first and second gripping surfaces on each opposing jaw are contiguous with said third and fourth gripping surfaces of the clamping elements.

8. The oil filter removal tool of claim 1, wherein said jaws are made from steel.

9. The oil filter removal tool of claim 1, wherein said opposing handles are covered with a non-slip covering.

* * * * *